Feb. 12, 1952     J. C. GORDON     2,585,109

METHOD OF MAKING EMBOSSED RUG CUSHIONS

Filed May 13, 1950

INVENTOR.
Jack C. Gordon
BY
Daniel G. Cullen
Attorney

Patented Feb. 12, 1952

2,585,109

UNITED STATES PATENT OFFICE 2,585,109

METHOD OF MAKING EMBOSSED RUG CUSHIONS

Jack C. Gordon, Detroit, Mich., assignor to Allen Industries, Inc., Detroit, Mich.

Application May 13, 1950, Serial No. 161,814

2 Claims. (Cl. 117—10)

This application relates to methods of making embossed rug cushions, and particularly aims to provide a novel method of making embossed, rigid and nonstretchable rug cushions of felt, such as felted jute or hair, and having both surfaces coated with a cured sealing compound, and embossed in a suitable pattern.

The sealing compound may be rubber latex, either natural or synthetic, or any rubber dispersion, either natural or synthetic. One suitable compound is known as "Neoprene." This is a synthetic product made by DuPont Company of Wilmington, Delaware, and described in Patent No. 2,402,837 of June 25, 1946. It is known as chloroprene and is identified by the formula chlor-2-butadiene-1,3. It is a rubber emulsion or dispersion compound with typical accelerators, age retarders, vulcanizing agents and other basic ingredients, fillers, pigments and the like. While the exact composition of the neoprene, which I have successfully used in making the rug cushion hereof, is not known, it is not believed to be material. It is a typical neoprene composition and is obtained under identification of Neoprene 571. For the purposes of this application it may be considered that any suitable sealing compound of the rubber latex, or rubber dispersion class, of which neoprene is an example, may be utilized.

The present invention aims to provide a novel method of making a rug cushion or pad, both of whose surfaces are coated with an above-mentioned sealing compound and embossed and whose edges are beveled.

This application is a continuation-in-part of my prior application, Serial No. 115,877, filed September 15, 1949, now Patent No. 2,572,470, granted October 23, 1951, which is directed to the article produced by the method hereof.

The method hereof generally is similar to that of my prior application, Serial No. 58,129, filed November 3, 1948, adding, however, the important step of partly drying the coatings before embossing or compacting them.

Figure 1:
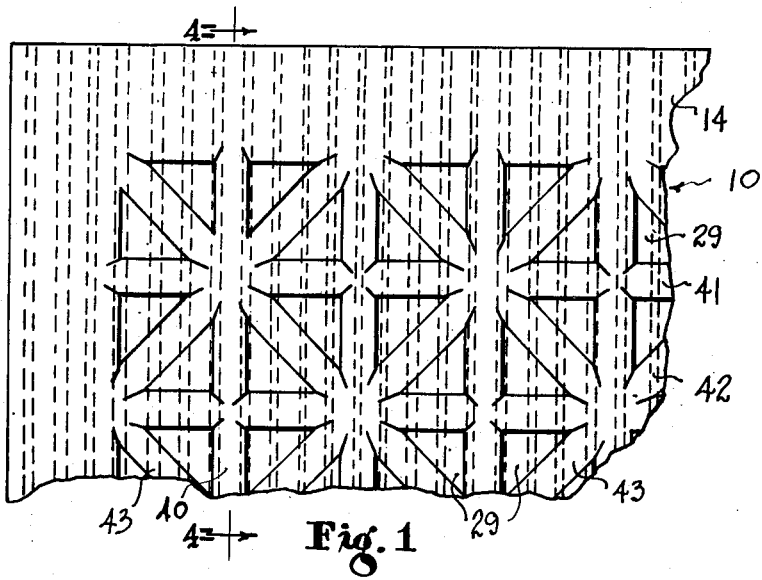
Figure 2:
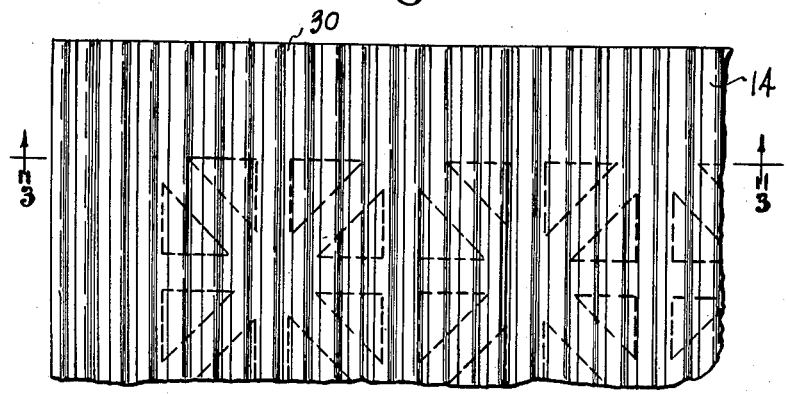
Figure 3:
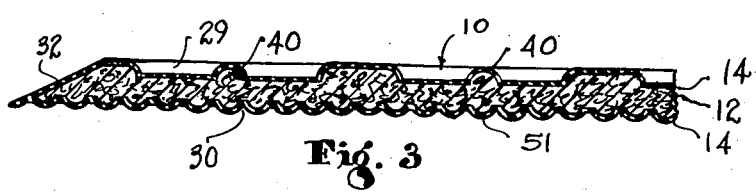
Figure 4:
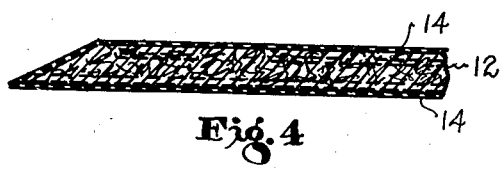

In order to afford an understanding of this invention, it will be described in connection with an illustrative embodiment thereof shown in the accompanying drawing; further purposes, features and advantages of this invention will be apparent from the following description of this invention and of the embodiment thereof shown in the drawing wherein Figs. 1 and 2 are fragmentary plan views of a rug cushion, taken from opposite faces; and Figs. 3 and 4 are relatively transverse section views as if on lines 3—3 and 4—4 of Figs. 1 and 2, showing the patterning and embossment on both faces of the rug cushion.

One preferred embodiment of the invention is shown in Figs. 1-4. The cushion is indicated generally by reference numeral 10 and consists of a base sheet made of felt. The felt will consist of jute or hair or a percentage of jute and hair fibers garnetted and needled to make a felt product of a given density. A form of reinforcement such as tobacco cloth or burlap, not shown, may be used in the center of the felt 12 if a stronger product is desired.

Both faces of the pad are coated, as will later be described, with cured sealing compound coatings whose details and provision will later be described.

As the first step in the manufacture of the rug cushion, the felt base 12 is passed through a dye bath and then to surplus squeezing rollers and a drying oven containing drying rolls. There the felt base is dried and passed on to rolls where the sealing or coating compound is applied to both surfaces.

The coating of the felt sheet can be accomplished by various well known methods. It may be applied by roll coating, as shown, or it could be accomplished by spray coating, or a combination of the two methods could be used. In any event, after the felt sheet has passed through the drying oven, its surfaces are coated with a coating compound.

It is pointed out here that the coating, reference 14, is a superficial film or surface coating of minimum thickness to cover and with as little penetration or impregnation as possible. With this in mind, the film or coating should be at a minimum thickness, and while roll coating might be employed, spraying has been found far more satisfactory to the end of maintaining a minimum thickness.

After the coating is applied, the coated sheet is dried, at least partially, but without curing the coating, by being passed over drying rollers. Drying before embossing reduces the degree of stiffening of the surface coating and leaves it considerably more resilient than would be the case if the wet coating were embossed and cured. Drying before embossing also prevents the coatings from being squeezed into the pad during the embossing.

From here the coated felt sheet is passed to curing and embossing compression rollers in the form of hollow rollers having their outer surfaces provided with male protuberances to form indented patterns in the opposite faces of the travelling coated felt sheet. The rollers are provided with internal electrical heating means, not shown, for curing the coatings on the sheet. The heating requirement of the rollers may range between 180° F. to 450° F., depending upon which type of compound is used for coating the felt sheet. Air blown through the hollow rollers will aid in the final drying and curing of the coatings. Regardless of the form, apparatus should be used to effect complete curing of the coatings.

From here the coated sheet may be passed to two sets of rollers which respectively bevel and trim the edges of the coated felt sheet as shown at 32 in Fig. 3.

The sealing compound may be mixed with various types of antioxidants and curing ingredients and stabilizers to permit a perfect application and curing of the sealing compound with complete assurance that no oxidation or deterioration will take place after the sealing compound has been applied to the felt sheet and cured.

The coating 14 thus formed is quite resilient and rubbery and the interior of the pad, between the coatings, in the main, is free of impregnation by the coating, the degree of impregnation being only sufficient to insure bonding.

It will be observed that the center portion of the rug cushion is not at all penetrated by the coatings of sealing compound on the opposite surfaces of the rug cushion, nor is densified or cured by the compression rollers. The projections of these rollers are so designed as merely to densify and cure the outer surfaces of the rug cushion, stiffening these surfaces, but leaving the center portion of the felt sheet comparatively unchanged, and, hence, pliable in accordance with the characteristics of the felt sheet before coating.

*The patterning or embossing of the rug cushion*

One face of the rug cushion is shown as embossed with a waffle or checkered rib pattern which leaves continuous ribs 40—41—42—43 on that face of maximum height. Ribs 40 are parallel to the axis of the cylinder into which the rug cushion is rolled for storage and handling. Ribs 40—41—42—43 rigidify the cushion in all lateral directions. The indentations 29 are relatively deep, in a preferred embodiment being .085" deep.

The opposite face is also embossed, but the pattern of embossment is quite different, being in the form of longitudinally extending grooves 30 parallel to the axis of rolling of the rug cushion. Between these grooves are ribs 51 of maximum thickness.

Ribs 40 of one face match the ribs 51 of the other to provide sections 52 of maximum thickness. The longitudinal grooves 30 are relatively less deep than the indentations 29 of the waffle pattern, in a preferred embodiment being .035" deep.

Thus, the minimum thickness is equal to the thickness of the felt sheet minus .120", and the maximum thickness at sections 52 equal to the original thickness of the sheet.

The provision of the longitudinal grooves 30 parallel to the axis of rolling facilitates rolling of the rug cushion without buckling.

The coating is a film of rubber, not dispersed into the felt, but being outside the felt, though bonded to it at the surfaces of rubber and felt where they interengage. It is really a separate layer, sufficiently thick to be self-identified, and is not a dispersion into the felt. Because it is dried at least partly before being embossed, it is not squeezed into the felt, though squeezed against the felt, and hence retains its identity as a separate layer, bonded to the felt. The embossing merely patterns the rubber layer, and densifies it between the ribs in the depressed areas, the ribs remaining substantially undensified. The layer of rubber is not squeezed into the felt, neither by the embossing, nor during the drying, nor at any time, though it is squeezed against the felt for bonding during the drying and embossing.

The finished product appears as a felt sheet having self-identifying, recognizable, separate rubber layers bonded thereto and embossed or patterned, with no appreciable dispersion of the rubber layers into or through the felt layer.

While this invention has been decribed in connection with certain illustrative embodiments thereof, it is to be understood that this has been done merely for exemplification and that the scope of the invention is to be limited only by the following claims.

What I claim is:

1. The method of forming a floor covering rug cushion underlay comprising a thick, loosely matted and felted fiber cushion base having a substantially spongy resilience by having a pattern embossed on at least one surface thereof, said pattern comprising a suitable configuration of a plurality of embossed indentations, each of said indentations being separated from each other by unindented ridges, both indented and raised ridge portions lying solely in a surface of the rug cushion, and cured as a continuous film of a resilient rubber composition having sufficient thickness to be identifiable as a coherent rubbery layer having integrally included therein the fibers lying solely on the surface only of said fiber base, whereby said surface will retain its configuration, having enhanced cushioning effect, said method comprising applying a liquid coating to at least one surface of the felted matted fiber base, said coating consisting of aqueous rubber latex whereby the solids are retained on the surface of the felted fiber coated therewith, while allowing only the aqueous suspending medium to substantially penetrate the loosely matted fiber base, at least partially drying the wet coating of rubber particles on the fiber, and then heating and compressing said coated fiber mat between embossing rolls heated in the temperature range of 180° to 450° F., said rolls being adjusted to impart to said matted fiber base sufficient pressure only to coalesce said rubber particles into an integral continuous film and to bond the uppermost fibers of said matted base while imparting thereto said embossed pattern, said heated rolls simultaneously effecting evaporation of a portion of the liquid suspending medium to set said coating to a degree sufficient to retain said embossed pattern.

2. The method of claim 1 wherein the coating composition is neoprene latex.

JACK C. GORDON.

REFERENCES CITED

The following references are of record in the file of this patent:

UNITED STATES PATENTS

| Number | Name | Date |
|---|---|---|
| 1,985,203 | Charbonneau | Dec. 18, 1934 |
| 2,010,871 | Madge et al. | Aug. 13, 1935 |
| 2,032,114 | Clemens | Feb. 25, 1936 |
| 2,193,496 | Schwartz et al. | Mar. 12, 1940 |
| 2,208,236 | Wiener | July 16, 1940 |
| 2,213,296 | Zinser | Sept. 3, 1940 |
| 2,244,097 | Burkart | June 3, 1941 |
| 2,314,162 | Reinhardt | Mar. 16, 1943 |
| 2,541,868 | Gordon | Feb. 13, 1951 |

FOREIGN PATENTS

| Number | Country | Date |
|---|---|---|
| 330,456 | Great Britain | June 12, 1930 |